United States Patent
Ben-Zvi et al.

(10) Patent No.: US 12,104,465 B2
(45) Date of Patent: Oct. 1, 2024

(54) METHOD FOR CARBON DIOXIDE OR HYDROGEN SULFIDE SEQUESTRATION IN A SUBTERRANEAN RESERVOIR VIA PUMPING USING SORBENT PARTICLES IN A CARRIER GAS

(71) Applicant: Cenovus Energy Inc., Calgary (CA)

(72) Inventors: Amos Ben-Zvi, Calgary (CA); Michael Patrick McKay, Calgary (CA); Paulina Morasse, Calgary (CA)

(73) Assignee: CENOVUS ENERGY INC., Calgary (CA)

( * ) Notice: Subject to any disclaimer, the term of this patent is extended or adjusted under 35 U.S.C. 154(b) by 0 days.

(21) Appl. No.: 17/817,189

(22) Filed: Aug. 3, 2022

(65) Prior Publication Data

US 2023/0050105 A1    Feb. 16, 2023

Related U.S. Application Data

(60) Provisional application No. 63/229,916, filed on Aug. 5, 2021.

(51) Int. Cl.
*E21B 41/00*    (2006.01)

(52) U.S. Cl.
CPC ...... *E21B 41/0064* (2013.01); *E21B 41/0057* (2013.01)

(58) Field of Classification Search
CPC .............................. E21B 41/0064; E21B 43/36
See application file for complete search history.

(56) References Cited

U.S. PATENT DOCUMENTS

| 2002/0157536 A1 | 10/2002 | Espin et al. |
| 2012/0067568 A1* | 3/2012 | Palmer ............ E21B 43/40 |
| | | 166/402 |

(Continued)

FOREIGN PATENT DOCUMENTS

| CA | 2897078 A1 | 1/2016 |
| CA | 2915623 A1 | 6/2017 |

(Continued)

OTHER PUBLICATIONS

Ravinder Kumar, et al. The role of nanotechnology on post-combustion CO2 absorption in process industries, International Journal of Low-Carbon Technologies, vol. 15, Issue 3, Aug. 2020, pp. 361-367.

(Continued)

*Primary Examiner* — Silvana C Runyan
(74) *Attorney, Agent, or Firm* — ARENTFOX SCHIFF LLP

(57) ABSTRACT

Methods are provided for sequestering a pollutant gas of carbon dioxide ($CO_2$) gas and/or hydrogen sulfide ($H_2S$) gas in a subterranean reservoir. In one method, a carrier gas containing pollutant-sorbent particles (e.g., nanoparticles) is pumped into the subterranean reservoir, the pollutant-sorbent particles attach to the subterranean reservoir, the pollutant gas is pumped into the subterranean reservoir, and the pollutant-sorbent particles attached to the subterranean reservoir adsorb the pollutant gas. In another method, pollutant gas is introduced into a carrier liquid containing pollutant-sorbent particles to produce a pollutant-rich carrier liquid, the pollutant-rich carrier liquid is pumped into the subterranean reservoir, and the pollutant-rich carrier liquid is allowed to remain in the subterranean reservoir. A modifier gas or modifier liquid may be injected into the subterranean reservoir to modify a condition in the subterranean reservoir (Continued)

and thereby cause the pollutant-sorbent particles to release the sequestered pollutant gas.

17 Claims, 6 Drawing Sheets

(56) References Cited

U.S. PATENT DOCUMENTS

| | | | | |
|---|---|---|---|---|
| 2012/0292055 | A1* | 11/2012 | Swist | E21B 43/18 166/400 |
| 2013/0180708 | A1* | 7/2013 | Ware | E21B 43/24 166/272.3 |
| 2014/0216739 | A1* | 8/2014 | Brown | C09K 8/592 166/272.3 |
| 2017/0058186 | A1* | 3/2017 | Oghena | C09K 8/592 |
| 2018/0216449 | A1* | 8/2018 | Benzvi | C09K 8/594 |

FOREIGN PATENT DOCUMENTS

| | | |
|---|---|---|
| CA | 2916141 A1 | 6/2017 |
| WO | 2008070990 A1 | 6/2008 |

OTHER PUBLICATIONS

Kim, Jinguk et al. CO2 Separation using Surface-functionalized SiO2 Nanoparticles incorporated Ultra-Thin Film Composite Mixed Matrix Membranes for Post-combustion Carbon Capture. 2016. Journal of Membrane Science. 515.

Lin, Kun-Yi Andrew et al. Effects of bonding types and functional groups on CO2 capture using novel multiphase systems of liquid-like nanoparticle organic hybrid materials. Environmental Science Technology. Aug. 1, 2011; 45 (15):6633-9.

Ota, Misaki et al. CO2 Adsorption Property of Amine-Modified Amorphous TiO2 Nanoparticles with a High Surface Area. Colloids Interfaces 2018, 2, 25.

Zhang, Huiying & Liu, Ruiqiang & Ning, Tangyuan & Lal, Rattan. Higher CO2 absorption using a new class of calcium hydroxide (Ca(OH)2) nanoparticles. Environmental Chemistry Letters. 2018. 16. pp. 1095-1100.

Wan Nor Roslam Wan Isahak et al. Enhancement of CO2 Capture Using CuO Nanoparticles Supported on Green Activated Carbon. Advanced Materials Research. 2015. 1087. pp. 111-115.

Mishra, Ashish et al. Nano magnetite decorated multiwalled carbon nanotubes: A robust nanomaterial for enhanced Carbon Dioxide adsorption. Energy Environ. Sci. 2011. 4. pp. 889-895.

Planetary Hydrogen, "Technology", online: <https://www.planetaryhydrogen.com/technology/>, retrieved Jul. 3, 2021.

Sekhavatjou, M.S. et al. A New Method For Sulphur Components Removal From Sour Gas Through Application of Zinc And Iron Oxides Nanoparticles. International Journal of Environmental Research (IJER) 2014. 8(2), pp. 273-278.

Abdelrahman Ibrahim El-Diasty, SPE, The American University in Cairo (AUC) and Suez University, Egypt and Adel M. Salem Ragab. Applications of Nanotechnology in the Oil & Gas Industry: Latest Trends Worldwide & Future Challenges in Egypt. Society of Petroleum Engineers. 2013.

S. I. Martinez, PDVSA Intevep S.A.; C. Bastidas, Universidad Nacional Experimental Politécnica de la Fuerza Armada. Application of Transition Metal Nanoparticles in the Streams Production of Heavy Crude Oil Treatment: H2S Mitigation. Society of Petroleum Engineers. 2017.

Christof Weinlaender et al. Low-temperature H2S removal for solid oxide fuel cell application with metal oxide adsorbents. Adsroption Science & Technology. Oct. 7, 2016. 35(1-2). pp. 120-136.

S. L. Whittaker, Clean Stream Technologies Middle East FZE. Use of NanoActive® Sulphur Scavenger NASS for H2S Removal in the Oil and Gas Industry. Society of Petroleum Engineers. 2018.

Amvrosios G. Georgiadis, Nikolaos D. Charisiou and Maria A. Goula. Removal of Hydrogen Sulfide From Various Industrial Gases: A Review of The Most Promising Adsorbing Materials. Catalysts. May 8, 2020. 10, 521.

Syed Mubeen, Ting Zhang, Nicha Chartuprayoon, Youngwoo Rheem, Ashok Mulchandani, Nosang V. Myung, and Marc A. Deshusses. Sensitive Detection of H2S Using Gold Nanoparticles Decorated SWNTs. Anal. Chem. 2010; 82 (1); 250-257.

Izabela Konkol, Jan Cebula, Adam Cenian. Oxidization of hydrogen sulphide in biogas by manganese (IV) oxide particles. Aug. 14, 2019. Environ. Eng. Res. 2021; 26(20; 190343, (6 Pages Total).

Costa, C.; Cornacchia, M.; Pagliero, M.; Fabiano, B.; Vocciante, M.; Reverberi, A.P. Hydrogen Sulfide Adsorption by Iron Oxides and Their Polymer Composites: A Case-Study Application to Biogas Purification. Materials 2020, 13, 4725.

Blatt, O., Helmich, M., Steuten, B., Hardt, S., Bathen, D. and Wiggers, H. (2014), Iron Oxide/Polymer-Based Nanocomposite Material for Hydrogen Sulfide Adsorption Applications. Chem. Eng. Technol., 37: 1938-1944.

Georgiadis, A.G.; Charisiou, N.D.; Yentekakis, I.V.; Goula, M.A. Removal of Hydrogen Sulfide (H2S) Using MOFs: A Review of the Latest Developments. Chem. Proc. 2020, 2, 27.

Nabipoor Hassankiadeh, Mojtaba & Hallajisani, Ahmad. (2020). Abstract of Application of Molybdenum oxide nanoparticles in H2S removal from natural gas under different operational and geometrical conditions. Journal of Petroleum Science and Engineering. 190.

* cited by examiner

METHOD FOR CARBON DIOXIDE OR HYDROGEN SULFIDE SEQUESTRATION IN A SUBTERRANEAN RESERVOIR VIA PUMPING USING SORBENT PARTICLES IN A CARRIER GAS

CROSS-REFERENCE TO RELATED APPLICATION(S)

This Application claims priority of U.S. Provisional Application No. 63/229,916 entitled "CARBON DIOXIDE OR HYDROGEN SULFIDE SEQUESTRATION IN A SUBTERRANEAN RESERVOIR USING SORBENT PARTICLES" filed on Aug. 5, 2021, the disclosure of which is expressly incorporated by reference herein in its entirety.

FIELD OF THE INVENTION

The present invention relates to carbon dioxide and/or hydrogen sulfide sequestration in a subterranean reservoir using sorbent particles, which may be nanoparticles.

BACKGROUND OF THE INVENTION

Steam Assisted Gravity Drainage and Steam Chambers

Steam assisted gravity drainage (SAGD) is a technique for producing oil from a subterranean reservoir that involves injecting steam from the surface into an upper horizontal well (an injection well) disposed in the reservoir above a lower horizontal well (a production well). The injected steam exits the injection well and rises in the reservoir to form a steam-saturated zone, which is conceptualized as a "steam chamber", where heavy oil is heated by the steam and thereby reduced in viscosity. The reduced-viscosity oil drains downward by gravity into the production well, through which it is produced to the surface. As production continues, the zone of the reservoir in the steam chamber will become progressively "depleted"—i.e., its oil saturation decreases.

Carbon Capture and Sequestration

In general, carbon capture and sequestration (CCS) involves capturing carbon dioxide ($CO_2$) emitted from industrial sources, transporting the $CO_2$ to a storage site, and sequestering the $CO_2$ in the storage medium, so that the $CO_2$ does not enter the atmosphere. CCS may performed to mitigate climate change effects of $CO_2$ emissions.

Sequestration may apply adsorption-based techniques, whereby $CO_2$ is taken up, either physically or chemically, by the surface of an adsorbent in solid phase. Metal-organic frameworks (MOF) and nanoparticles may be used as sorbents for adsorption-based CCS techniques. Sequestration may also apply absorption-based techniques, whereby $CO_2$ enters the bulk phase of an absorbent liquid. Absorption may be by physical dissolution, or by chemical reaction with a reagent in the absorbent liquid, such as amine, to convert the $CO_2$ to a product that more readily remains in the absorbent liquid.

CCS may use a subterranean reservoir for a storage site. $CO_2$ may be stored in liquid phase, but this requires the temperature of the reservoir to be sufficiently low and the pressure of the reservoir to be sufficiently high to maintain the $CO_2$ in the liquid phase, which is not always the case. Alternatively, $CO_2$ may be stored in supercritical form—i.e., the $CO_2$ is at a temperature and pressure above its critical point, where distinct liquid and gas phases do not exist, but below the pressure required to compress it into a solid. The critical temperature of $CO_2$ is about 31.0° C., and the critical pressure of $CO_2$ is about 7.381 MPa. Substantial energy is required to compress $CO_2$ to the supercritical phase. Further, it can be difficult to quantify the total subterranean pressure required to maintain $CO_2$ in the supercritical phase, if other subterranean gaseous components (e.g., water vapor, methane ($CH_4$), and hydrogen sulfide ($H_2S$)) that contribute to the total subterranean gas pressure are present in unknown concentrations.

Hydrogen Sulfide in Produced Oil and Natural Gas Streams

Crude oil and natural gas produced from reservoirs may have high concentrations of hydrogen sulfide ($H_2S$). $H_2S$ is a dangerous, toxic, and corrosive gas. Methods are available for separating $H_2S$ gas from crude oil and natural gas streams after they have been produced to the surface. While it may be possible to utilize hydrogen sulfide in industrial processes (e.g., preparation of sulfuric acid and sulfur), there may be circumstances where it would be preferable to avoid or reduce storage, transportation, and handling of the hydrogen sulfide gas.

Prior Art

U.S. patent application publication no. 2002/0157536 A1 (Espin et al.; Oct. 31, 2002), titled "Method for Removing $H_2S$ an $CO_2$ from Crude and Gas Streams" discloses positioning a metal-containing nanoparticle in a stream containing $H_2S$ and $CO_2$, with the metal-containing nanoparticle being selected from metal oxides, metal hydroxides and combinations thereof, whereby the nanoparticles adsorb the contaminants from the stream. In one embodiment, Espin et al. discloses that the stream is a downhole stream established from a hydrocarbon producing subterranean formation, and the nanoparticles are positioned in fractures induced into formation in the form of proppants and/or additives to proppants. The hydrocarbon stream produced through the fractures is exposed to the nanoparticles and $CO_2$ and $H_2S$ is adsorbed downhole.

PCT International patent application publication no. WO 2008/070990 (Larter et al.; Jun. 19, 2008), titled "Preconditioning an Oilfield Reservoir" discloses a method of enhancing recovery of a petroleum product in an oilfield reservoir that includes heavy or bitumen. The method involves injecting water including a preconditioning agent into a mobile water film included in the oilfield reservoir, and preconditioning the reservoir with the preconditioning agent prior to production of the petroleum product form the oilfield reservoir. Larter et al. discloses particular embodiments where the preconditioning promotes carbon dioxide sequestration, and the precondition agent comprises calcium-rich brine. Larter et al. does not disclose the source of the carbon dioxide, but elsewhere discloses formation of carbon dioxide in situ in the reservoir by reaction of preconditioning agents, or by production processes to enliven oil or bitumen production. Larter et al. discloses embodiments where the preconditioning agent includes hydrogen sulfide to modify the viscosity of oil in the reservoir. Larter et al. discloses other embodiments where the precondition agent contains a water soluble sulphate to make hydrogen sulfide in the reservoir to enliven oil being produced and hence improve recovery. Larter et al. discloses other distinct embodiments where the preconditioning is performed to modify magnetic properties of the reservoir, and the preconditioning agent may include magnetite nanoparticles, such as nanomagnetite or magnetite, complexed with multidentate carboxylic.

I. Martinez, and C. Bastidas, in "Application of Transition Metal Nanoparticles in the Streams Production of Heavy Crude Oil Treatment: H$_2$S Mitigation", (2017) Society of Petroleum Engineers, 2017, disclose experiments to simulate application of iron oxide, copper oxide, and nickel oxide nanoparticles during temperature and pressure conditions of steam injection for oil production. Martinez et al. uses a high vacuum gas oil (HVGO) (an aromatic solvents mixture) as a carrier fluid for the nanoparticles. Use of such a carrier fluid would add cost and complexity to hydrocarbon production.

There remains a need in the art for improved methods for carbon dioxide and hydrogen sulfide sequestration in subterranean reservoirs.

SUMMARY OF THE INVENTION

The present invention provides methods for sequestering a pollutant gas comprising either carbon dioxide (CO$_2$) or hydrogen sulfide (H$_2$S), or both, by injecting the pollutant into a subterranean reservoir, and using pollutant-sorbent particles to sequester the pollutant in the subterranean reservoir.

In a first aspect, the method comprises the steps of: (a) pumping a carrier gas containing the pollutant-sorbent particles into the subterranean reservoir; (b) allowing the pollutant-sorbent particles to attach to the subterranean reservoir; and (c) pumping the pollutant gas into the subterranean reservoir, and allowing the pollutant-sorbent particles attached to the subterranean reservoir to adsorb the pollutant gas, thereby sequestering the pollutant gas in the subterranean reservoir. In embodiments of the method of the first aspect, pumping the pollutant gas into the subterranean reservoir in step (c) may be performed either after or at the same time as pumping the carrier gas containing the pollutant-sorbent particles into the subterranean reservoir in step (a). In embodiments of the method of the first aspect, the carrier gas may comprise steam, air or methane.

In a second aspect, the method comprises the steps of: (a) introducing pollutant gas into a carrier liquid containing pollutant-sorbent particles to produce a pollutant-rich carrier liquid; and (b) pumping the pollutant-rich carrier liquid into the subterranean reservoir, and allowing the pollutant-rich carrier liquid to remain in the subterranean reservoir. In embodiments of the method of the second aspect, the carrier liquid may comprise water.

In embodiments of the methods of the first aspect or second aspect, the pollutant gas comprises CO$_2$ gas, and the pollutant-sorbent particle comprises CO$_2$-sorbent particles comprising a material selected from the group consisting of: a metal-organic framework (MOF); ethylenediamene; aluminum oxide (Al$_2$O$_3$); boron nitride (BN); calcium hydroxide (Ca(OH)$_2$); calcium oxide (CaO); calcium carbonate (CaCO$_3$); carbon including activated or porous carbon; copper oxide (CuO); gold (Au); graphene; graphene oxide; iron oxide (Fe$_2$O$_3$); lithium orthosilicate (Li$_4$SiO$_4$); magnesium oxide (MgO); magnetite (Fe$_3$O$_4$); nickel oxide (NiO); silicon/calcium (Si/Ca); silicon dioxide (SiO$_2$); titanium dioxide (TiO$_2$); a zeolite; and zirconium oxide (ZrO$_2$).

In embodiments of the methods of the first aspect or second aspect, the pollutant gas comprises H$_2$S, the pollutant-sorbent particle comprises H$_2$S-sorbent particles comprising a material selected from the group consisting of: a metal-organic framework (MOF); zinc oxide (ZnO), iron oxide (Fe$_2$O$_3$), magnetite (Fe$_3$O$_4$), copper oxide (CuO), nickel oxide (NiO), calcium oxide (CaO), manganese oxide (MnO$_2$), and molybdenum oxide (MoO$_2$).

In embodiments of the methods of the first aspect or second aspect, the pollutant-sorbent particles have a maximum dimension (e.g., diameter) less than about 1,000 nm, more particularly less than about 500 nm, even more particularly less than about 250 nm. In embodiments, the particles are nanoparticles—i.e., particles having a maximum dimension (e.g., diameter) less than about 100 nm, and even more particularly less than about 25 nm.

In one embodiment of the methods of the first aspect or second aspect, the subterranean reservoir comprises a zone of a depleted steam chamber of a well that was used for a steam injection operation for enhancing recovery of hydrocarbons, such as a SAGD injection well. In the method of the first aspect, step (a) may be performed during or after a blowdown operation on the steam chamber. In such embodiments, the carrier gas may comprise steam mixed with air or methane.

In one embodiment of the methods of the first aspect or second aspect, the method comprises the further steps of: injecting a modifier gas or modifier liquid, such as steam, air, methane or an alkaline chemical (e.g., sodium hydroxide (NaOH); sodium silicate (Na$_2$SiO$_3$); sodium carbonate (Na$_2$CO$_3$); and mixtures thereof), into the subterranean reservoir to vary one or more of a temperature in the subterranean formation, a pressure in the subterranean formation, or a pH of a liquid in the subterranean reservoir, and thereby cause the pollutant-sorbent particles to release the sequestered pollutant gas; and producing the released pollutant gas from the subterranean reservoir to the surface (i.e., to ground level). In the method of the first aspect, a first downhole well may be used for one or both of pumping the carrier gas containing the pollutant-sorbent particles into the subterranean reservoir and pumping the pollutant gas into the subterranean reservoir; and the same first well or a different second well may be used for producing the released pollutant gas from the subterranean reservoir to the surface. In the method of the second aspect, a first well may be used for pumping the pollutant-rich carrier liquid into the subterranean reservoir; and the same first well, or a different second well may be used for producing the released pollutant gas from the subterranean reservoir to the surface. In one embodiment of the method of the first aspect or the second aspect, the steps are repeatedly performed to cyclically sequester the pollutant gas in the subterranean reservoir, and produce the released pollutant gas from the subterranean reservoir to the surface.

In embodiments of the method of the first aspect, pumping the pollutant gas into the subterranean reservoir in step (c) comprises pumping a flue gas comprising the pollutant gas and at least one non-pollutant gas into the subterranean reservoir. In embodiments of the method of the second aspect, introducing pollutant gas into the carrier liquid containing the pollutant-sorbent particles in step (a) comprises introducing a flue gas comprising the pollutant gas and at least one non-pollutant gas into the carrier liquid containing the pollutant-sorbent particles.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 5 is also a schematic depiction of method of FIG. 10 showing the production of $CO_2$ to the surface, from $CO_2$ sequestered in a subterranean reservoir.

DETAILED DESCRIPTION OF EMBODIMENTS OF THE INVENTION

Figure 1:
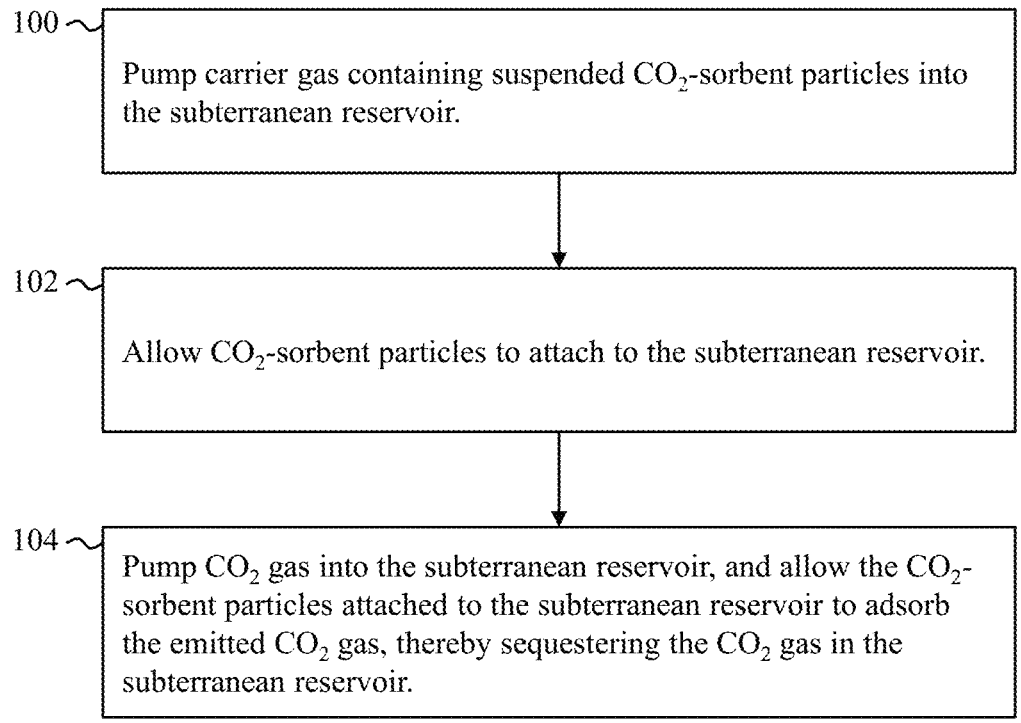
FIG. 1 is a flow chart of an embodiment of a first method of the present invention, for sequestering CO$_2$ (as the pollutant gas) in a subterranean reservoir, using a carrier gas to inject $CO_2$-sorbent particles in the subterranean reservoir.

Definitions.

The present invention relates to sequestration of a pollutant gas comprising either carbon dioxide ($CO_2$) gas or hydrogen sulfide ($H_2S$) gas, or both, in a subterranean reservoir using pollutant-sorbent particles.

Any term or expression not expressly defined herein shall have its commonly accepted definition understood by a person skilled in the art. As used herein, the following terms have the following meanings.

"Subterranean reservoir" refers to a subsurface body of rock having porosity and permeability that is sufficient to permit storage and transmission of a liquid or gaseous fluid.

"Pollutant-sorbent particle", as used herein, refers to a particle that has an affinity for the "pollutant". In embodiments, the pollutant-sorbent particle has a maximum dimension (e.g., a diameter) less than 1000 nm, more particularly less than 500 nm, even more particularly less than 250 nm. In embodiments, the pollutant-sorbent particle is a "nanoparticle", which as used herein, refers to a particle that has a maximum dimension less than 100 nm. In embodiments, a nanoparticle may have a maximum dimension less than 50 nm, and more particularly less than 25 nm. In one example, the "pollutant" is $CO_2$, and hence the pollutant-sorbent particle is a "$CO_2$-sorbent particle", that has an affinity for $CO_2$. In another example, the "pollutant" is $H_2S$, and hence the pollutant-sorbent particle is a "$H_2S$-sorbent particle" that has an affinity for $H_2S$. In embodiments, this affinity may be based on principles of adsorption—i.e., the pollutant-sorbent particle physically adheres and/or chemically bonds to pollutant. In embodiments, this affinity may be based on principles of absorption of pollutant into a carrier liquid containing the pollutant-sorbent particle—i.e., the pollutant-sorbent particle enhances the ability of the carrier liquid to incorporate pollutant into the volume of the carrier liquid, whether by physical and/or chemical absorption.

"Metal-organic framework", and its abbreviation "MOF", refers to a porous material formed by compounds comprising metal ions or metal-ion clusters coordinated to organic ligands.

"Flue gas" refers to a gas produced as an emission from the combustion of a fossil fuel. As a non-limiting example, flue gas may include a mixture of water vapor, oxygen, carbon dioxide, carbon monoxide, hydrogen sulfide, nitrogen oxides, and sulfur oxides.

Overview.

In embodiments, the present invention provides methods for sequestering a pollutant gas comprising either carbon dioxide, or hydrogen sulfide, or both, by injection of the pollutant into a subterranean reservoir.

The method is not limited by any particular duration for which the pollutant is sequestered. For example, the present invention may be used to sequester pollutant on a permanent basis. Alternatively, the present invention may be used to sequester on pollutant a short-term or temporary basis, followed by release of the pollutant.

The method is not limited by the source of the pollutant gas. In a non-limiting example, the source may be flue gas produced by a hydrocarbon production facility, where the flue gas includes carbon dioxide and/or hydrogen sulfide, and possibly other gaseous components. In one embodiment, the flue gas is cooled at the surface (i.e., before injection into the subterranean reservoir), or by contact with water, such as basal water in the subterranean reservoir, to reduce the water content in the flue gas. In one embodiment, the flue gas is produced by combustion of fossil fuels in relatively pure oxygen rather than air, to produce flue gas that comprises relatively pure $CO_2$, water vapour, and other trace substance. In another non-limiting example, the source may be carbon dioxide that has been captured and separated from other components of a flue gas. In another non-limiting example, the source may be air or $CO_2$ that has been separated from air. In another non-limiting example, the source may be hydrocarbon streams that include $CO_2$ and $H_2S$, which are produced to the surface from subterranean reservoirs. The $CO_2$ and $H_2S$ may be separated from the produced hydrocarbons, optionally compressed, and then sequestered in accordance with then the method of the present invention.

The method is not limited by the nature of the subterranean reservoir. In a non-limiting example, the subterranean reservoir may be a depleted oil reservoir, and more particularly, the zone of the depleted steam chamber of a well that was used for a steam injection operation used to enhance hydrocarbon recovery. For example, the steam chamber may be associated with a well that was used to inject steam for a SAGD, steam flooding (also known as steam drive), or cyclic steam stimulation (CSS) operation. In other examples, the subterranean reservoir may be a reservoir after being subjected to cold heavy oil production with sand (i.e., a post-CHOPS reservoir), or a water-rich formation where the water can be displaced from the formation.

Broadly, the methods of the present invention may be classified into two approaches: a first method that uses a carrier gas, as described below with reference to FIGS. 1 to 5; and a second method that uses a carrier liquid, as described below with reference to FIGS. 6 to 7. Both approaches inject pollutant-sorbent particles in the subterranean reservoir to enhance the capacity, if any, of naturally occurring mineral or liquids in the reservoir to sequester the pollutant gas (i.e., $CO_2$ and/or $H_2S$) in the subterranean reservoir. In other words, the capacity of the reservoir to sequester pollutant is artificially enhanced by the pollutant-sorbent particles that are attached to the reservoir.

The pollutant-sorbent particles should be sized so that they can permeate through the pores of the subterranean reservoir, without substantially impairing transmission of a liquid or gaseous fluid through the subterranean reservoir. A suitable size of pollutant-sorbent particles may be selected having regard to the characteristics of a particular subterranean reservoir. As a non-limiting example, for subterranean reservoirs containing oil sands in Alberta, Canada, a suitable maximum dimension (e.g., diameter) of pollutant-sorbent particles may be less than about 1,000 nm, more particularly less than about 500 nm, and even more particularly less than about 250 nm. In some embodiments, the pollutant-sorbent particles may be nanoparticles—i.e., particles having a maximum dimension (e.g., diameter) less than about 100 nm, more particularly less than about 50 nm, and even more particularly less than about 25 nm. As known in the art, nanoparticles may have a variety of morphologies, with non-limiting examples including spherical particles, and nanotubes, among others.

Use of pollutant-sorbent particles having higher surface area per mass may increase their efficacy in adsorption of the pollutant gas. In embodiments, the pollutant-sorbent particles have a surface area per mass in the range from about 1 to about 3,000 $m^2/g$. In some embodiments, the surface area per mass may be greater than 50 $m^2/g$, greater than about 100 $m^2/g$, greater than about 250 $m^2/g$, greater than about 500 $m^2/g$, greater than about 750 $m^2/g$, and greater than about 1,000 $m^2/g$.

The pollutant-sorbent particles may be selected to have a desired adsorption capacity, having regard to factors such as the amount or concentration of the pollutant gas to be sequestered, or a desired rate of sequestration. For example, in embodiments where the pollutant-sorbent particles are $CO_2$-sorbent particles, they may have an adsorption capacity (mg $CO_2$/g sorbent material) in the range from about 0.1-15,000 mg/g. In some embodiments, the adsorption capacity may be greater than about 10 mg/g, more particularly greater than about 50 mg/g, more particularly greater than about 100 mg/g, more particularly greater than about 500 mg/g, and more particularly greater than about 1,000 mg/g.

Preferably, the selected pollutant-sorbent particles are relatively economical to use in large volumes.

In some embodiments of the method, it may be preferable for the selected pollutant-sorbent particles to have an affinity for pollutant that is higher than its affinity for other gases such as nitrogen ($N_2$), water vapor, or methane ($CH_4$) that may be present in a subterranean reservoir.

In some embodiments of the method where it is desired that pollutant remains adsorbed/absorbed despite variations in subterranean temperature and pressure or gas compositions comprising the pollutant (e.g., flue gas), it may be preferable for the selected pollutant-sorbent particles to have an affinity for the pollutant that is very stable over a range of expected subterranean temperatures and pressures, and expected gas compositions.

In other embodiments of the method that are used to cyclically release adsorb/absorb and then release the pollutant, as described below, it may be preferable for the selected pollutant-sorbent particles to have a relatively higher affinity for the pollutant over some range of conditions (e.g., relatively low temperature or low pressure) and a relatively lower affinity for the pollutant under other conditions (e.g., relatively high temperature or high pressure). The affinity for the pollutant may also be pH-dependent. Thus, intentionally applied changes in temperature, pressure, and/or pH conditions in the subterranean formation may be used to selectively release the pollutant from the pollutant sequestered in the subterranean formation.

In some embodiments of the method that are used to simultaneously sequester other gases (e.g., sulfur dioxide ($SO_2$), nitrogen oxides ($NO_x$, including NO and $NO_2$), as may be present in flue gas), it may be preferable for the selected pollutant-sorbent particles to also have an affinity for such other gases. In such embodiments, it may be preferable for the selected pollutant-sorbent particles to have higher affinity for the pollutant than such other gases. This may allow the method to be used to sequester the pollutant in preference to other gases. In addition or in the alternative, in response to applied changes in temperature, pressure, and/or pH, the selected the pollutant-sorbent particles may release the pollutant at greater rates than other gases. One or both of these properties may allow for release of gas from the subterranean formation having relatively higher purity of the pollutant than the original source gas (e.g., flue gas) of the pollutant that was sequestered in the subterranean formation.

Adaptation of Described Examples for $H_2S$ Sequestration and Release.

In the following examples of methods described with reference to FIGS. 1 to 10, $CO_2$ is the pollutant to be sequestered in the subterranean formation (and optionally released from the subterranean formation), and therefore $CO_2$-sorbent particles are used for the pollutant-sorbent particles. It will be understood that all of the following examples described with reference to FIGS. 1 to 10 may be adapted for $H_2S$, in addition or alternative to $CO_2$, as the pollutant to be sequestered in the subterranean formation (and optionally released from the subterranean formation). In such methods, the pollutant-sorbent particles would therefore include $H_2S$-sorbent particles in addition or alternative to $CO_2$-sorbent materials. Thus, the following description and FIGS. 1 to 10 apply mutatis mutandis with $H_2S$ substituted for $CO_2$, $H_2S$-sorbent particles for $CO_2$-sorbent materials and particles, and "$H_2S$-rich carrier liquid" substituted for "$CO_2$-rich carrier liquid."

The selected of composition of the pollutant-sorbent particles will therefore depend on the pollutant gas to be sequestered. That is, when the pollutant gas to be sequestered includes $CO_2$, then the pollutant-sorbent particles should include $CO_2$-sorbent particles. In contrast, when the pollutant gas to be sequestered includes $H_2S$, then the pollutant-sorbent particles should include $H_2S$-sorbent particles. Pollutant-sorbent particles of certain compositions have affinity for both $CO_2$ and $H_2S$, and as such, it will be understood that the possible compositions of $CO_2$-sorbent particles may overlap with the compositions of $H_2S$-sorbent particles. Non-limiting examples of $CO_2$-sorbent particles and $H_2S$-sorbent particles are provided below under the headings "Examples of $CO_2$-sorbent particles" and "Examples of $H_2S$-sorbent particles", respectively.

Carrier Gas-Based Method.

Figures 2, 3, 4:
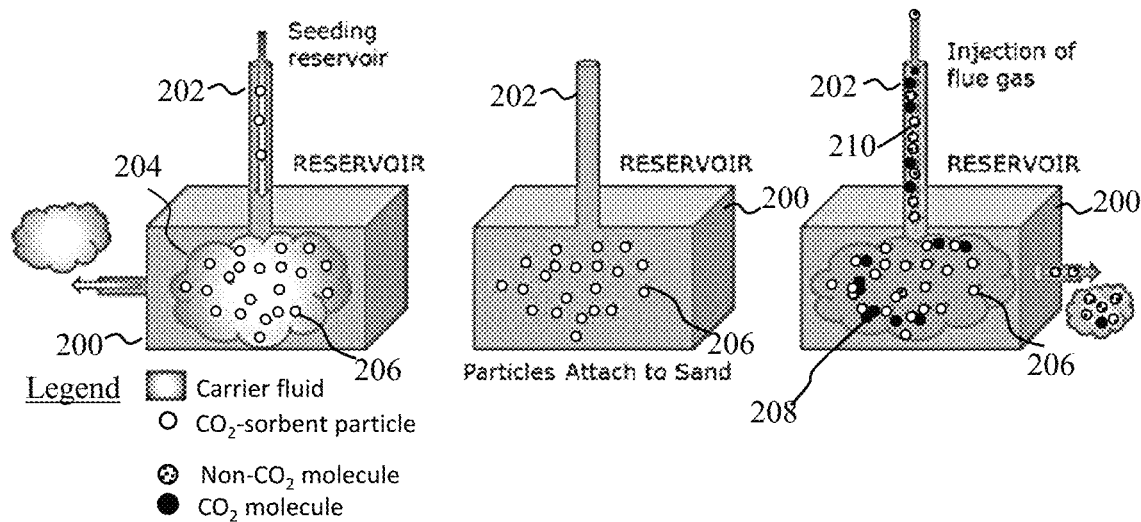
FIG. 2 is schematic depiction of a first stage of a sequential injection approach to the method of FIG. 1, where carrier gas containing $CO_2$-sorbent particles is pumped into a subterranean reservoir.
FIG. 3 is schematic depiction of a second stage of the sequential injection approach to the method of FIG. 1, where $CO_2$-sorbent particles attach to sand in the subterranean reservoir.
FIG. 4 is schematic depiction of a third stage of the sequential injection approach to the method of FIG. 1, where emitted $CO_2$ is pumped into the subterranean reservoir, and adsorbed therein by $CO_2$-sorbent particles.
Figure 5:
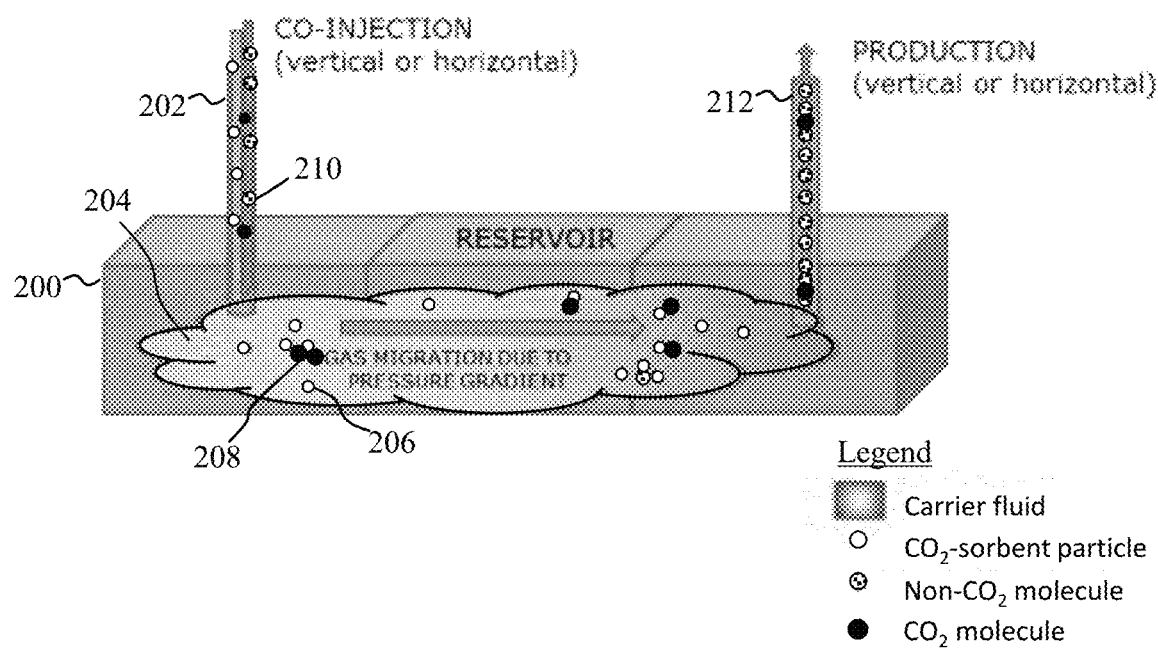
FIG. 5 is a schematic depiction of a co-injection approach to the method of FIG. 1, where $CO_2$-sorbent particles and $CO_2$ gas are continuously pumped into the subterranean reservoir at the same time.

FIG. 1 is a flow chart of a first method of the present invention, for sequestering $CO_2$, as the pollutant, in a subterranean reservoir, using a carrier gas to inject the $CO_2$-sorbent particles in the subterranean reservoir. FIGS. 2-4 are schematic depiction of stages of a first embodiment of this method. FIG. 5 is a schematic depiction of a second embodiment of this method.

This first embodiment of the method shown schematically in FIGS. 2-4 is referred to as a "sequential injection approach" because the $CO_2$-sorbent particles are first injected into the subterranean reservoir, followed by injection of the $CO_2$ to be sequestered into the subterranean reservoir. The method may be repeated to sequester additional $CO_2$ in the subterranean reservoir as needed. The second embodiment of the method shown schematically in FIG. 5 is referred to as a "co-injection approach" because the $CO_2$-sorbent particles and $CO_2$ to be sequestered are injected at the same time into the subterranean reservoir.

Referring to FIG. 1, at step 100, a carrier gas containing suspended $CO_2$-sorbent particles is pumped into the subterranean reservoir. The $CO_2$-sorbent particles can be suspended in the carrier gas even at relatively low flow velocities of the carrier gas, on account of the small size of the $CO_2$-sorbent particles. The $CO_2$-sorbent particles should be of sufficiently small size to effect this desired suspension in the carrier gas, for a given flow velocity of the carrier gas, and able to permeate through pores of the subterranean reservoir.

The present invention is not limited by the nature of the carrier gas, but it will be appreciated that the carrier gas should be selected so as to avoid reactivity with the $CO_2$-sorbent particles in a way that would impair their affinity for $CO_2$. In one embodiment, the carrier gas may be air, methane, steam, or mixtures thereof.

FIGS. 2 and 5 are schematic depictions of step 100, in the sequential injection approach and the co-injection approach, respectively, showing the subterranean reservoir 200, a downhole tubing string 202, and the carrier gas 204 containing suspended $CO_2$-sorbent particles 206 being pumped into the subterranean reservoir 200.

Referring back to FIG. 1, at step 102, the $CO_2$-sorbent particles that were pumped into the subterranean reservoir in step 100, are allowed to attach to the subterranean reservoir. This step may be performed without any active intervention, by allowing for relatively quiescent conditions in the subterranean reservoir. For example, pumping of the carrier gas is ceased to leave the $CO_2$-sorbent particles in the subterranean reservoir relatively undisturbed. The $CO_2$-sorbent particles will adhere to sand particles in the subterranean reservoir, owing to the small size of the $CO_2$-sorbent particles.

FIGS. 3 and 5 are schematic depictions of step 102, in the sequential injection approach and the co-injection approach, respectively, showing the $CO_2$-sorbent particles 206 attached to sand particles of the subterranean reservoir 200.

Referring back to FIG. 1, at step 104, $CO_2$ gas is pumped into the subterranean reservoir, and the $CO_2$-sorbent particles attached to the subterranean reservoir (as a result of step 102) are allowed to adsorb the $CO_2$ gas. Thus, the $CO_2$ gas is sequestered in the subterranean reservoir.

FIG. 4 is a schematic depiction of step 104, in the sequential injection approach, showing flue gas comprising a mixture of $CO_2$ gas molecules 208, and non-$CO_2$ gas molecules 210, being pumped via downhole tubing string 202 into the subterranean reservoir. The non-$CO_2$ gas molecules 210 may be other gases found in flue gas, such as hydrogen sulfide ($H_2S$), sulfur dioxide ($SO_2$), nitrogen oxides ($NO_x$, including NO and $NO_2$). Upon contacting the $CO_2$-sorbent particles 206 attached to the subterranean reservoir (as a result of step 102), the $CO_2$-sorbent particles 206 adsorb at least a portion of the $CO_2$ gas molecules 208. In some embodiments, the $CO_2$-sorbent particles 206 may have an affinity for some or all of the non-$CO_2$ gas molecules 210, and thus adsorb them and sequester them in the subterranean reservoir 200 as well. In other embodiments, the $CO_2$-sorbent particles 206 may have low or no affinity for the non-$CO_2$ gas molecules 210, and thus allow the non-$CO_2$ gas molecules 210 to be transmitted through the subterranean reservoir 200.

FIG. 5 is a schematic depiction of step 104 in the co-injection approach. In contrast to the sequential approach shown in FIGS. 2 to 4, the flue gas comprising the $CO_2$ molecules and the carrier gas containing suspended $CO_2$-sorbent particles are pumped at the same time into the subterranean reservoir. In comparison to the sequential approach of FIGS. 2 to 4, the co-injection approach of FIG. 5 may be advantageous in maintaining availability of "fresh" $CO_2$-sorbent particles in the subterranean formation. In one example, as shown in FIG. 5, the flue gas comprising the $CO_2$ molecules and the carrier gas containing suspended $CO_2$-sorbent particles may be pumped via separate conduits leading into the injecting tubing 202 of an injection well.

Figure 8:
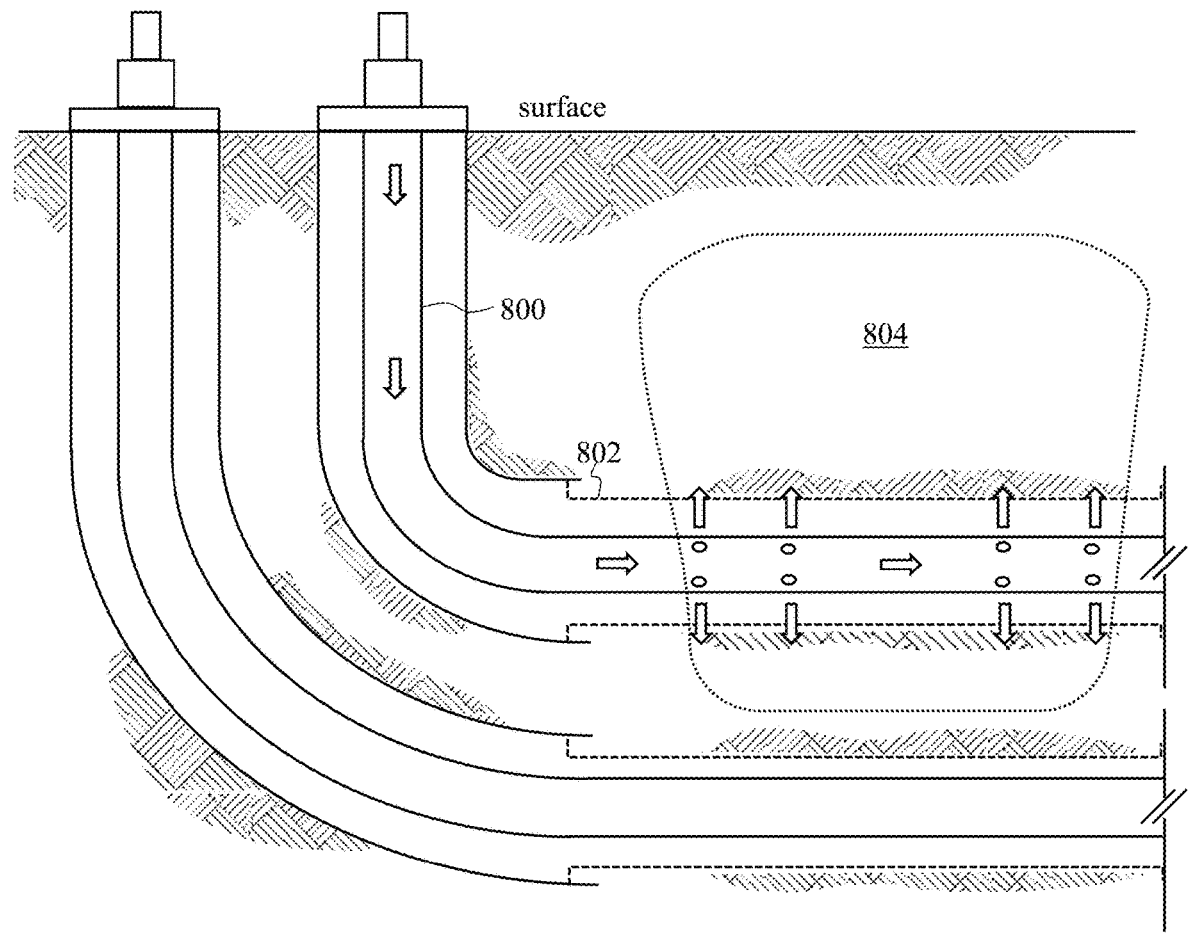
FIG. 8 is a schematic depiction of a SAGD well system that may be used in implementing methods of the present invention.

FIG. 8 is a schematic depiction of a SAGD well system that may be used in an exemplary implementation of the method of FIG. 1, whether for the sequential injection approach or the co-injection approach. At step 100, surface pumping equipment (not shown) is used to pump the carrier gas containing suspended $CO_2$-sorbent particles into an injection tubing string 800. As an example, the surface pumping equipment may be modified to introduce a stream of $CO_2$-sorbent particles into a stream of air being pumped by the surface pumping equipment, so that the air and $CO_2$-sorbent particles mix together before entering into the injection tubing string 800. As an another example, one pump may be used to pump air (or other carrier gas) into the injection tubing string 800, while another pump may be used to pump $CO_2$-sorbent particles into the injection tubing string 800 so that they mix together in the injection tubing string 800. In either case, the flow of air (or other carrier gas) in the injection tubing string will cause the small $CO_2$-sorbent particles to be suspended in the air. In a horizontal leg of the well, the carrier gas containing suspended $CO_2$-sorbent particles exit the injection tubing string 800 via openings thereof, and flow through a slotted injection liner 802 into the zone of the depleted steam chamber 804 (as denoted by the dotted line boundary). In one embodiment, step 100 may be performed during or shortly after so-called "blowdown" operations, after steam injection has been terminated, and a non-condensable gas (e.g., air, methane, steam, or mixtures thereof) is injected into the steam chamber to maintain pressure in the steam chamber 804. At step 102, pumping of the carrier gas ceases, and the $CO_2$-sorbent particles in the steam chamber 804 are allowed to adhere to sand particles in the steam chamber 804. At step 104, surface pumping equipment (not shown) is used to pump flue gas into the steam chamber 804 via the injection tubing string 800 and slotted injection liner 802. The $CO_2$ molecules of the flue gas migrate into the steam chamber 804 and are adsorbed by the $CO_2$-sorbent particles in the steam chamber 804, and thereby sequestered in the steam chamber 804.

Carrier Liquid-Based Method.

Figure 6:
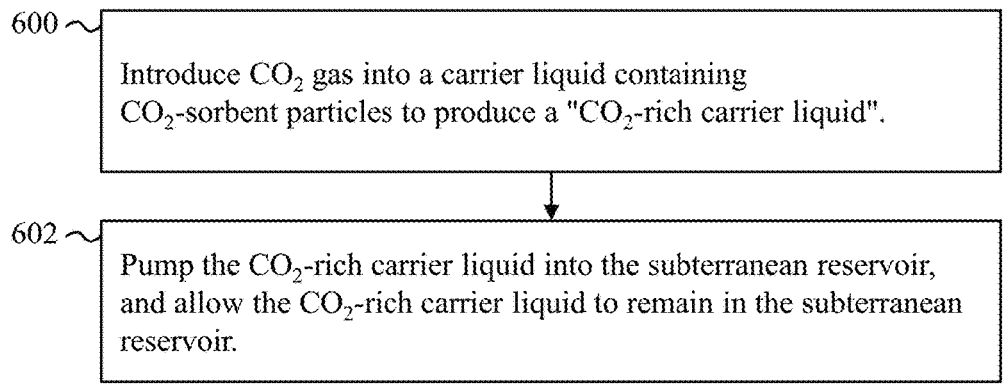
FIG. 6 is a flow chart of an embodiment of a second method of the present invention, for sequestering $CO_2$ (as the pollutant gas) in a subterranean reservoir, using a carrier liquid comprising $CO_2$-sorbent particles to absorb $CO_2$ gas, and injecting the $CO_2$-rich carrier liquid into the subterranean reservoir.

FIG. 6 is a flow chart of a second method of the present invention, for sequestering $CO_2$ in a subterranean reservoir, where a carrier liquid comprising $CO_2$-sorbent particles and absorbed $CO_2$ is injected into the subterranean formation. Although the absorption is expected to the dominant $CO_2$ sorption mechanism in this method, it is possible that the $CO_2$ may also be adsorbed to the surface of $CO_2$-sorbent particles contained in the carrier liquid. Thus, it will be understood that the method is not limited by exclusion of adsorption of $CO_2$ by the $CO_2$-sorbent particles.

Referring to FIG. 6, at step 600, $CO_2$ gas is introduced into a carrier liquid containing $CO_2$-sorbent particles. The present invention is not limited by the nature of the carrier liquid, but it will be appreciated that the carrier liquid should be selected so as to avoid reactivity with the $CO_2$-sorbent particles in a way that would impair their affinity for $CO_2$. In one embodiment, the carrier liquid may be water.

Figure 7:
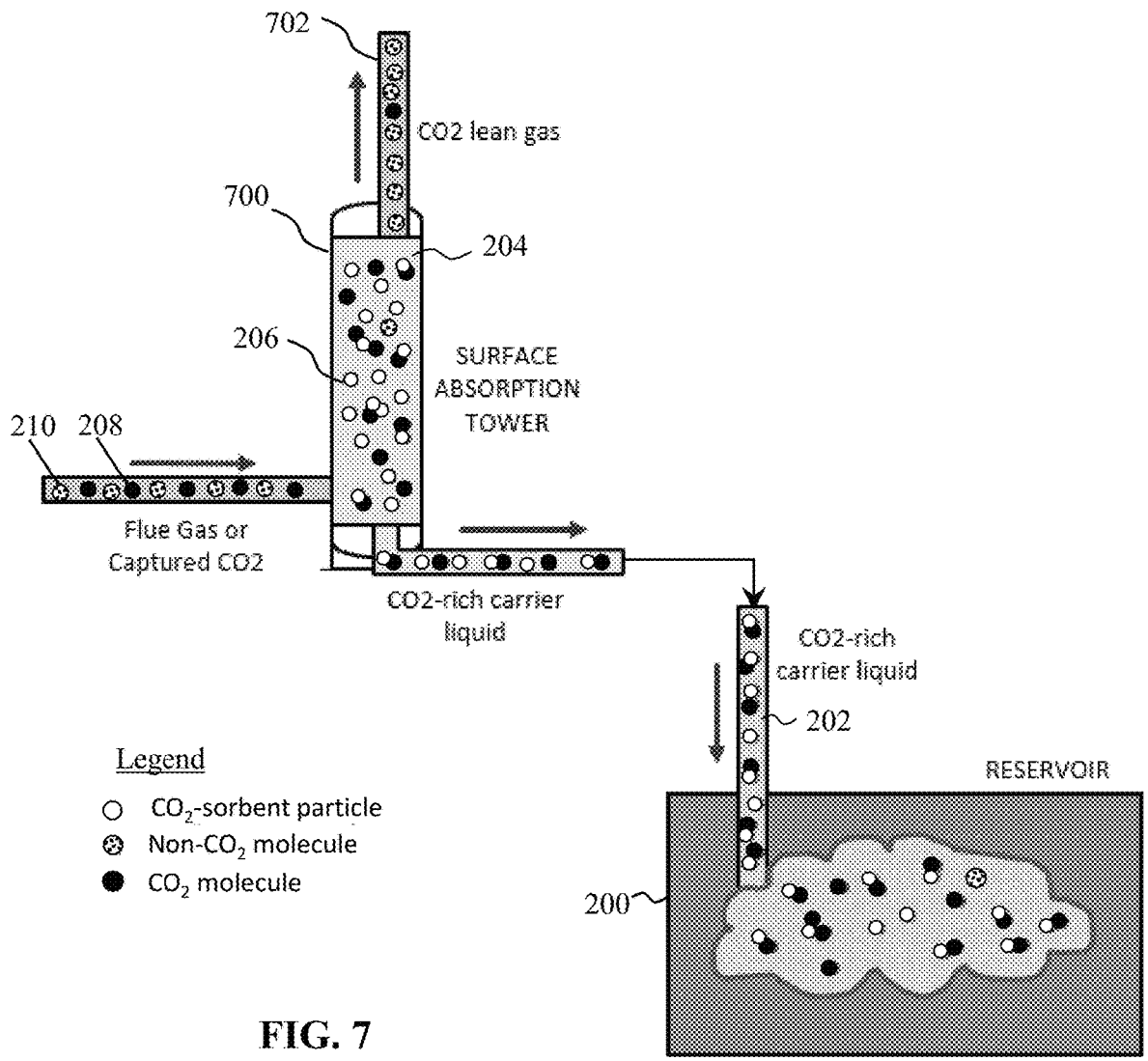
FIG. 7 is a schematic depiction of the method of FIG. 6.

FIG. 7 (left side) is a schematic depiction of step 600. As a non-limiting example, water as the carrier liquid 204 may be stored in a vessel 700 at the surface, and emitted flue gas or captured $CO_2$ gas comprising $CO_2$ molecules 208, and possibly non-$CO_2$ molecules 210, may be "bubbled into" the carrier liquid 204 in the vessel 700. Alternatively, the flue gas may be directly introduced into surface piping conveying the carrier fluid 204 to the downhole tubing string 202. In comparison to water without $CO_2$-sorbent particles, the $CO_2$-sorbent particles, such as by adsorption of $CO_2$ to the $CO_2$-sorbent particles, will enhance absorption of the $CO_2$ gas into the water, for a given set of temperature and pressure conditions.

As a result, at least some of the $CO_2$ molecules are absorbed in the carrier liquid to produce what is referred to herein as a "$CO_2$-rich carrier liquid" (or a "pollutant-rich carrier liquid" in the general case) to conveniently distinguish it from carrier fluid prior to absorption of the $CO_2$ molecules. It will be appreciated, however, that some or all of the $CO_2$ that was contacted to produce the "$CO_2$-rich carrier liquid" (or the "pollutant-rich carrier liquid" in the general case) may actually be in forms other than aqueous $CO_2$ (or the aqueous pollutant in the generalized case). For example, a portion of the $CO_2$ may react with water to form carbonic acid. As another example, a portion of the $CO_2$ may react with the $CO_2$-sorbent particles to form other chemical species. (In the case where the pollutant is $H_2S$, a portion of the $H_2S$ may react with water to form bisulfide ions, and sulfide ions.) Inclusion such derivatives of the $CO_2$ (or pollutant gas in the general case) in the carrier liquid is considered to be within the scope of the "$CO_2$-rich carrier liquid" (or the "pollutant-rich carrier liquid" in the general case).

If flue gas (as opposed to captured $CO_2$) was bubbled into the vessel 700, then non-$CO_2$ components (e.g., hydrogen sulfide ($H_2S$), sulfur dioxide ($SO_2$), nitrogen oxides ($NO_x$, including $NO$ and $NO_2$) may or may not be absorbed into the carrier liquid 204. If not, then the non-$CO_2$ gas molecules, as well as any portion of the $CO_2$ gas molecules that were not absorbed into the carrier liquid, may exit the vessel 700 via an outlet 702 in communication with the headspace of the vessel 700.

Referring to FIG. 6, at step 602, the $CO_2$-rich carrier liquid is pumped into the subterranean reservoir, and allowed to remain the subterranean reservoir. The $CO_2$ gas is thereby sequestered in the subterranean reservoir.

FIG. 7 (right side) is a schematic depiction of step 602. The $CO_2$-rich carrier liquid 204 containing $CO_2$ molecules 208 (or derivatives as discussed above) and possibly non-$CO_2$ molecules 210, is pumped via the downhole tubing string 202 into the subterranean reservoir 200.

The SAGD well system of FIG. 8 may similarly be used in an exemplary implementation of the method of FIG. 6. Surface pumping equipment (not shown) is used to pump the $CO_2$-rich carrier liquid into an injection tubing string 800, via openings thereof and through the slotted injection liner 802 into the zone of the depleted steam chamber 804.

The method of FIG. 6 may be performed on a batch basis wherein the steps are performed in a discrete sequence to sequester a batch of $CO_2$, ceased, and then possibly repeated in respect to a subsequent discrete batch of $CO_2$. Alternatively, the method of FIG. 6 may be performed on a continuous basis, where the steps are performed simultaneously to process a continuously fed stream of $CO_2$. In this case, continuous injection of the $CO_2$-rich carrier liquid will tend to maintain a concentration $CO_2$-sorbent particles in the subterranean reservoir, thus counteracting any depletion of concentration $CO_2$-sorbent particles in the subterranean reservoir that may result from migration of the $CO_2$-rich carrier liquid or other causes.

Production of $CO_2$-Sorbent Particles.

Figure 9:
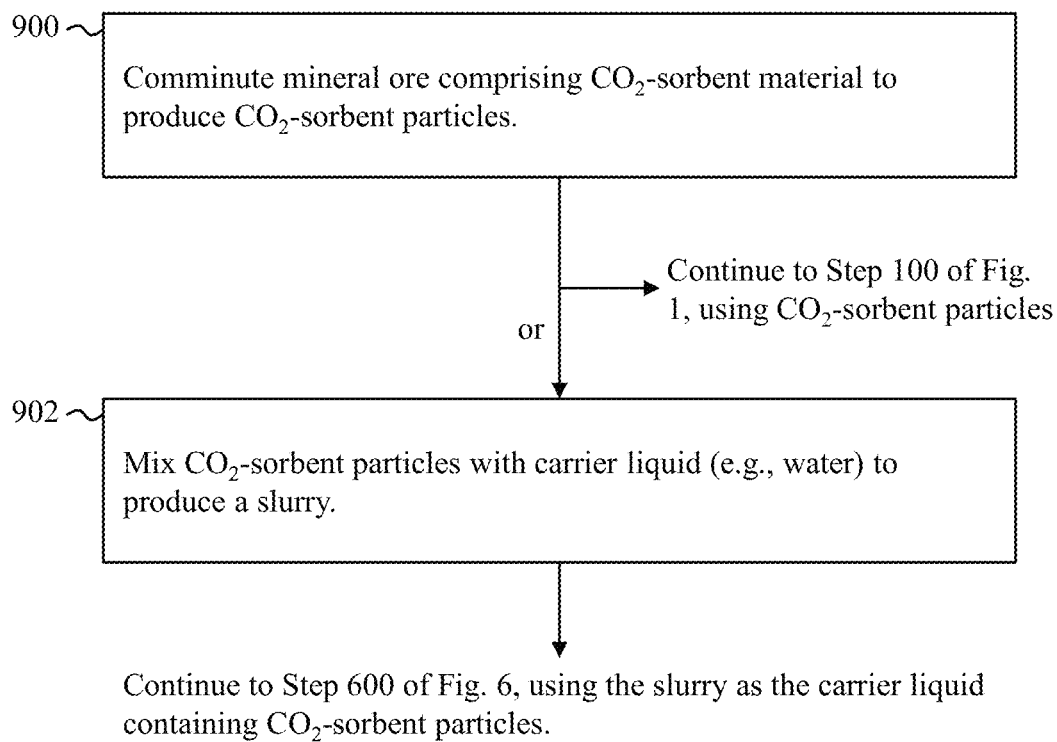
FIG. 9 is a flow chart of an embodiment of the method of the present invention for producing the carrier liquid containing $CO_2$-sorbent particles as the pollutant-sorbent particles, as may be used in the methods of FIG. 1 or FIG. 6.

The $CO_2$-sorbent particles that are used in the methods of FIG. 1 or FIG. 6 may be provided from a variety of sources. For example, they may be sourced from commercial vendors. Alternatively, they may be produced from mineral ore comprising the $CO_2$-sorbent material. Referring to FIG. 9, at step 900, the mineral ore is comminuted to produce $CO_2$-sorbent particles of suitable size for use in the method. As non-limiting examples, such comminution may be performed using ore crushing equipment used in mining operations followed by further grinding equipment, and then subjecting the resulting product to screening to separate particles of suitable size. In the case of the first method of FIG. 1, the resulting $CO_2$-sorbent particles can be used in step 100. Alternatively, at step 902, the resulting $CO_2$-sorbent particles can be mixed with a carrier liquid (e.g., water) to produce a slurry. The slurry can then be used as the carrier liquid containing $CO_2$-sorbent particles in step 600 of FIG. 6.

Production of $CO_2$ to the Surface.

The method of FIG. 1 and the method of FIG. 6 may be augmented to produce $CO_2$ to the surface from the $CO_2$ that is sequestered in the subterranean reservoir as a result of the methods as described above. The $CO_2$ produced to the surface may be used in an industrial process for a variety of purposes (e.g., as an inert gas, for cooling, or for chemical production, among others). In one embodiment, the released $CO_2$ is used for cyclic $CO_2$ stimulation, to enhance recovery of oil from a well. In such process, the released $CO_2$ is injected into another well, then the well is "shut in" for a soak phase, and then production from the well is resumed. In some embodiments of the methods, after the $CO_2$ has been produced to the surface, it may be cooled for certain applications to produce a cooled gas stream using surface equipment, with non-limiting examples including heat exchangers or an ammonia adsorption refrigeration system. (In the case where the pollutant is $H_2S$, the produced $H_2S$ may be used for industrial processes such as production of sulfuric acid or sulfur.)

In one embodiment, the modified method may be used to alternately sequester $CO_2$ in the subterranean reservoir, and then produce $CO_2$ from the subterranean reservoir to the surface. This may be performed cyclically. In this manner, the subterranean reservoir can act effectively as a very large capacity $CO_2$ adsorption or absorption tower.

Figure 10:
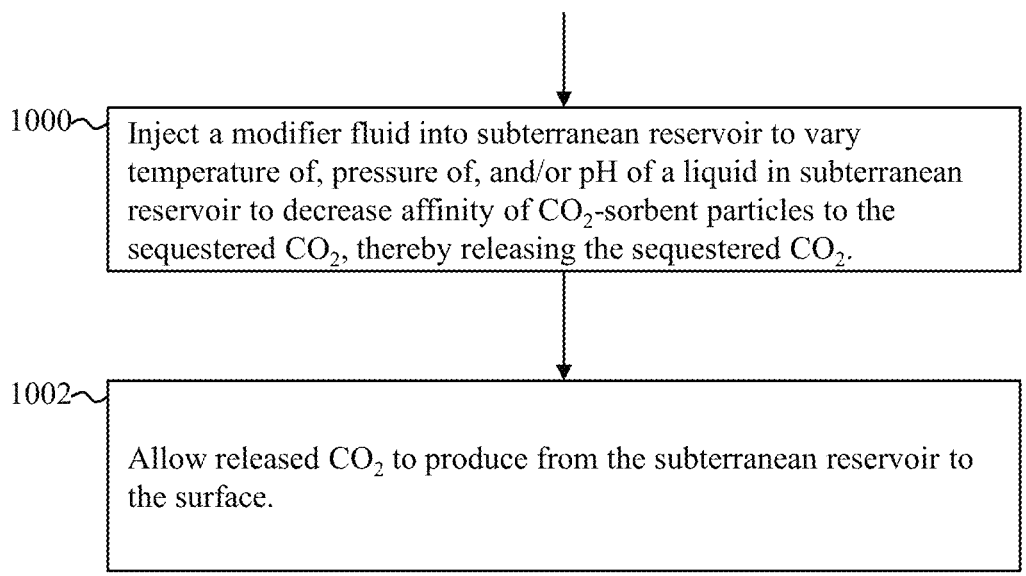
FIG. 10 is a flow chart of a method of the present invention for producing $CO_2$ to the surface, from $CO_2$ that was sequestered in a subterranean reservoir in accordance with the method of FIG. 1 or FIG. 6.

FIG. 10 is a flow chart of such modified method. The method continues form step 104 of FIG. 1 or from step 602 of FIG. 6, after which the $CO_2$ is sequestered in the subterranean reservoir.

At step 1000, gas or liquid is injected into the subterranean reservoir to vary one or a combination of temperature in the subterranean reservoir, a pressure in the subterranean reservoir, or pH (acidity) of a liquid in the subterranean reservoir. The gas or liquid injected during step 1000 is referred to herein as a "modifier gas" or "modifier liquid" to conveniently distinguish it conceptually from the "carrier gas" or "carrier liquid" described above. It will be understood that the "modifier gas" or "modifier liquid" may have the same composition as or a different composition than the "carrier gas" or "carrier liquid", as the case may be. By varying one or more of these conditions, the affinity of $CO_2$-sorbent particles to the sequestered $CO_2$ may be deceased, to thereby release the sequestered $CO_2$. To effect step 1000, the $CO_2$-sorbent particles should be selected so as to exhibit temperature-dependent, pressure-dependent, and/ or pH-dependent affinity for $CO_2$ within the range of temperature, pressure, and/or pH that can be practically manipulated by injection of the modifier gas or modifier liquid. Such dependencies are recognized properties of $CO_2$-sorbent particles available in the art, such as for "temperature swing", "pressure swing" or "pH swing" adsorption or absorption. As such, selection of a suitable $CO_2$-sorbent particle is within the skill of the person of ordinary skill in the art. As well, it will be appreciated that variation in pressure will affect solubility of $CO_2$ gas in accordance with Henry's Law, and solubility of $CO_2$ in a carrier liquid (if present, in the method of FIG. 6) will decrease with increasing temperature of the carrier liquid.

In step 1000, the modifier gas or modifier liquid may be injected into the subterranean reservoir using a well that is the same or different from the well that was used in the method of FIG. 1 to inject the carrier gas into the subterranean reservoir, or in the method of FIG. 6 to inject the $CO_2$-rich carrier liquid into the subterranean reservoir.

The present invention is not limited by the composition of the modifier gas or modifier liquid that is injected into the subterranean reservoir in step 1000. Non-limiting examples of the modifier gas or modifier liquid may include steam, methane, or chemicals to modify the pH of liquid in the subterranean reservoir. It is expected that injection of steam or other substances to heat liquids in the subterranean reservoir to about 100° C. will have the effect of decreasing the affinity of the $CO_2$-rich carrier liquid to sequester $CO_2$. Decreased pressure or applying a vacuum to the $CO_2$-rich carrier liquid is also expected to have this effect. Non-limiting examples of alkaline chemicals that may be used to vary temperature and/or increase the pH of liquid in the subterranean formation include solutions of sodium hydroxide (NaOH), sodium silicate ($Na_2SiO_3$), and sodium carbonate ($Na_2CO_3$), or mixtures of them.

At step 1002, the released $CO_2$ is allowed to produce to the surface. In one embodiment, the released $CO_2$ may produce to the surface via the same downhole well that was used in the method of FIG. 1 to inject the carrier gas and $CO_2$ into the subterranean reservoir, or in the method of FIG. 6 to inject the $CO_2$-rich carrier liquid into the subterranean reservoir.

In another embodiment, the released $CO_2$ may produce to the surface via one or a plurality of second well(s) in gas communication with the subterranean reservoir that are different from the one or plurality of first well(s) that are used to inject the carrier gas and $CO_2$ into the subterranean reservoir. Referring to FIG. 5, for example, the first downhole tubing string 202 of a first well is used for injection of carrier fluid and $CO_2$-sorbent particles (whether in accordance with the method of FIG. 1 or FIG. 6) into the subterranean reservoir as described above, while a second downhole tubing string 212 of a different second well, in the same subterranean reservoir 200, is used for production of released $CO_2$ from the subterranean reservoir. Due to a pressure gradient in the subterranean reservoir, the released $CO_2$ may migrate a distance from the first downhole tubing string 202 of the first well to the second downhole tubing string 212 of the second well.

It will be appreciated that the amount of $CO_2$ that is effectively sequestered in the subterranean reservoir may be controlled by selectively controlling operating parameters of the method. Among others, these operating parameters may include the type(s) and concentration of $CO_2$-sorbent particle used, the injection rate of $CO_2$ and $CO_2$-sorbent particles, and the injection rate of gas or liquid to vary the temperature, pressure, and/or pH conditions of the subterranean reservoir. Parameters of the method may be controlled so that the $CO_2$ is effectively, only "partially" sequestered in the subterranean reservoir. For example, referring to FIG. 5, the method may be controlled so that 80% to 90% of the $CO_2$ is allowed to produce through the second downhole tubing string 212, and effectively only 20% to 10% of the $CO_2$ is sequestered in the subterranean reservoir.

Examples of $CO_2$-Sorbent Particles.

A variety of materials may be used as $CO_2$-sorbent particles for effective $CO_2$ sequestration, as reported in the literature in the field, and as are known to persons skilled in the art.

Non-limiting examples of suitable MOFs for adsorption of $CO_2$ include MOFs known in the art as Mg-MOF-74, Co-MOF-74, and Mn-MOF-74, where MOF-74 results from the combination of divalent metallic cations with the divergent organic ligand 2,5-dihydroxybenzene-1,4-dicarboxylate (DBDC). Other suitable MOFs may be based on magnesium oxide (MgO) or calcium oxide (CaO). Further non-limiting examples of MOFs that maybe used to adsorb $CO_2$ are reviewed by Georgiadis et al. [Reference no. 22].

A variety of other materials may be used as $CO_2$-sorbent particles, and more particularly nanoparticles, for effective $CO_2$ sequestration, as described in References no. 1 to 7, and as are known to persons skilled in the art. Non-limiting examples of suitable particles that may comprise one or a combination of an amine (e.g., ethylenediamene) or amine functional group, organic hybrid materials [see Reference no. 3], aluminum oxide ($Al_2O_3$), boron nitride (BN), calcium hydroxide ($Ca(OH)_2$), calcium oxide (CaO), calcium carbonate ($CaCO_3$), carbon including activated or porous carbon, copper oxide (CuO), gold (Au), graphene, graphene oxide, iron oxide ($Fe_2O_3$), lithium orthosilicate ($Li_4SiO_4$), magnesium oxide (MgO), magnetite ($Fe_3O_4$), nickel oxide (NiO), silicon/calcium (Si/Ca), silicon dioxide ($SiO_2$), titanium dioxide ($TiO_2$), zeolites, and zirconium oxide ($ZrO_2$), among others.

Preferably, the selected $CO_2$-sorbent particles will allow for sequestration of $CO_2$ in the subterranean reservoir at a combination of temperature below the critical temperature of $CO_2$ (i.e., less than about 31.0° C.), and pressure below the critical pressure of $CO_2$ (i.e., less than about 7.38 MPa).

Examples of $H_2S$-Sorbent Particles.

A variety of materials may be used as $H_2S$-sorbent particles for effective $H_2S$ sequestration, as reported in the literature in the field, and as are known to persons skilled in the art. The following are further examples of the materials that may be used for $H_2S$-sorbent particles.

MOFs. Non-limiting examples of MOFs that maybe used to adsorb $H_2S$ are reviewed by Georgiadis et al. [Reference no. 15], and Georgiadis et al. [Reference no. 22], including MOFs based on vanadium, aluminum, chromium, titanium, zeolites, zinc, zinc oxide, zirconium oxide, graphite oxide, and MOF's known as M-MOF-74, and Ni-MOF-74.

Zinc oxide. Zinc oxide and $H_2S$ react to produce zinc sulfide (ZnS) and water, according to the following reaction.

$$ZnO_{(s)} + H_2S_{(g)} \rightarrow ZnS_{(s)} + H_2O_{(l)}$$

Zinc oxide nanoparticles are typically a solid, white, and odorless powder. Zinc oxide may be more stable and cost effective when compared with other adsorbents. A possible disadvantage is the limited feasibility of regeneration—i.e., desorption of adsorbed $H_2S$ to render the nanoparticle able to adsorb $H_2S$ again.

Reference no. 9 [Awume] reports performance characteristics of zinc oxide nanoparticles in the removal of $H_2S$ from gas streams. At ambient temperatures zinc oxide nanoparticles are up to 99% effective in capturing $H_2S$ gas. As feed $H_2S$ concentrations increase, the adsorption capacity also increases and the nanoparticles reach a saturation state more quickly, as summarized below in Table 1. Smaller zinc oxide nanoparticles (18 nm) have an overall higher adsorption capacity compared to larger particles (80 nm-200 nm). Larger zinc oxide particles, however, reached their saturation state faster, regardless of $H_2S$ feed concentration.

TABLE 1

| $H_2S$ Feed Concentration (mg/L) | Equilibrium $H_2S$ Adsorbed (g/g adsorbent) |
|---|---|
| 94.70 | 9.2 |
| 233.43 | 9.8 |
| 540.60 | 10.6 |
| 814.76 | 10.6 |
| 964.2 | 11.4 |
| 1501.85 | 14.9 |

The saturation rate of adsorbent is unaffected by temperature, but the adsorption capacity of zinc oxide nanoparticles increases with an increase in temperature, as summarized below in Table 2.

TABLE 2

| Temperature (° C.) | 541.4 mg/L Equilibrium $H_2S$ Adsorbed (g/g adsorbent) | 1567.8 mg/L Equilibrium $H_2S$ Adsorbed (g/g adsorbent) |
|---|---|---|
| 1 | 8.35 | — |
| 11 | 9.21 | 12 |
| 22 | 10.58 | 14.9 |
| 41 | 11.17 | 16.6 |

Adsorption capacities increase with an increase in the zinc oxide nanoparticle quantity. The saturation rate of the adsorbent was higher with a decrease in nanoparticle quantity, regardless of the $H_2S$ feed concentration.

Synthesized zinc oxide nanoparticles (14-25 nm) can completely remove $H_2S$ from water-based drilling mud in ~15 minutes, whereas bulk zinc oxide can remove ~2.5% of $H_2S$ in as long as 90 minutes under the same operating conditions.

Reference no. 14 [Whittaker] describes NanoActive™ Sulphur Scavenger (NASS) (Timilon Technology Acquisitions LLC; Naples, FL, USA), which is a zinc oxide (ZnO) nanoparticle sulphur recovery technology developed for the neutralization of $H_2S$ in crude oil and gas streams. Whittaker reports that NASS's two-step decomposition mechanism (adsorption by physisorption, followed by nonreversible chemical decomposition) substantially enhances its detoxification abilities because decomposition is less dependent on temperature. Whittaker reports that use of NASS™ improves scavenger efficacy between 4 and 6 times, depending on feed composition. Whittaker reports that the range at which NASS stand-alone systems are economical is up to 10,000 ppm $H_2S$ in liquid streams, and 1,000 ppm $H_2S$ at 320 m³/hr to 10,000 ppm $H_2S$ at 30 m³/hr in gas streams. At these levels, NASS reduces $H_2S$ to 0 ppm. For higher concentrations, NASS is used incombination with existing removal technologies.

Iron oxide ($Fe_2O_3$). Iron oxide reacts with $H_2S$ to produce iron sulfide (FeS) and water, according to the following reaction.

$$Fe_2O_3 + 3H_2S \rightarrow Fe_2S_3 + 3H_2O$$

Iron oxide nanoparticles have been shown to be very effective for $H_2S$ removal from gas streams at temperatures in excess in 300° C. Reference no. 20 [Blatt et al.] indicates that impregnating a custom-activated carbon with these nanoparticles resulted in a slight enhanced removal efficiency.

SULFATREAT™ (Schlumberger Limited, Houston, Texas, USA) is a granular iron oxide based $H_2S$ adsorbent and SELECT FAMILY™ (Schlumberger Limited, Houston, Texas, USA) is a mixed metal oxide-based $H_2S$ adsorbent, both of which are used to remove $H_2S$ from gas streams in fixed bed processes. It is possible that these sorbents may be physically reduced to nanoparticle size.

Magnetite ($Fe_3O_4$). Magnetite reacts with $H_2S$ at low pH to form hydrogen as a byproduct, according to the following equation.

$$Fe_3O_4 + 6H_2S \rightarrow 3FeS_2 + 4H_2O + 2H_2$$

Reference no. 12 [Martinez et al.] reports that magnetite nanoparticles have reached more than 93% in $H_2S$ mitigation.

Copper oxide (CuO). Copper oxide reacts with $H_2S$ is according to the following equation.

$$CuO + H_2S \rightarrow CuS + H_2O$$

Reference no. 12 [Martinez et al.] reports that copper oxide is thermodynamically favorable for sulphur removal, and that the reaction between copper oxides and sulfides is very fast and effective. Also, this oxide can be reduced to the metallic copper easily.

Reference no. 15 [Georgiadis et al.] reports that the presence of copper increased the mobility of sulfur anions in Cu—containing ZnS particles. Georgiadis et al. also reports that CuO has an extremely high equilibrium sulfidation constant that allows an extremely low equilibrium constant even at high temperatures.

Adsorbents with high Cu concentrations have been shown to be more efficient in capturing $H_2S$ compared to adsorbents with high Zn concentrations.

Nickel oxide (NiO). Nickel oxide reacts with $H_2S$ is according to the following equation.

$$NiO + H_2S \rightarrow NiS + H_2O$$

Reference no. 12 [Martinez et al.] reports results in $H_2S$ mitigation (83%) in studies of the application of nickel nanoparticles to treat heavy crude oil, Martinez et al. reports that three faces of nickel were generated (NiO, Ni° and $Ni_2S_3$), and for this reason, it was difficult to determine which material is working as the scavenger.

Gold (Au). Reference no. 16 [Mubeen et al.] reports that $H_2S$ is known to adsorb strongly onto gold because of the high chemical affinity between gold and sulphur. At temperatures between 165° K and 520° K, $H_2S$ decomposes to form SH which is chemisorbed onto the gold surface while $H_2$ is released. However, gold nanoparticles are a very expensive option and there is not much literature relating to gold and $H_2S$ adsorption.

Calcium oxide (CaO). Calcium oxide reacts with $H_2S$ is according to the following equation.

$$CaO + H_2S \rightarrow CaS + H_2O$$

Reference no. 18 [Wang] reports that calcium oxide a good choice for $H_2S$ adsorption at elevated temperatures (250-500° C.).

Manganese oxide ($MnO_2$). Manganese oxide reacts non-catalytically with $H_2S$ is according to the following equation.

$$MnO_2 + 2H_2S \rightarrow MnS + S + 2H_2O$$

Reference no. 17 [Konkol et al.] reports that desulphurization performance of different metallic oxides on activated carbon decreases in the following order: Mn>Cu>Fe>Ce>Co>V.

Molybdenum oxide ($MoO_2$). Reference no. 21 [Hassankiadeh et al.] reports that molybdenum oxide nanoparticles have an adsorption capacity of 0.081 and 0.074 g $H_2S$/g molybdenum oxide in low temperature and low concentration of $H_2S$ using non-spherical and spherical molybdenum oxide sorbent, respectively.

Interpretation.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

REFERENCES

All publications, patents and patent applications mentioned in this specification are indicative of the level of skill of those skilled in the art to which this invention pertains and are herein incorporated by reference, where permitted, to the same extent as if each individual publication, patent, or patent applications was specifically and individually indicated to be incorporated by reference.

Non-Patent Literature

1. Ravinder Kumar, Rajesh Mangalapuri, Mohammad Hossein Ahmadi, Dai-Viet N Vo, Rajniesh Solanki, Pawan Kumar, The role of nanotechnology on post-combustion $CO_2$ absorption in process industries, International Journal of Low-Carbon Technologies, Volume 15, Issue 3, August 2020, Pages 361-367.
2. Kim, Jinguk & Fu, Qiang & Xie, K. & Scofield, Joel & Kentish, Sandra & Qiao, Greg. (2016). $CO_2$ Separation using Surface-functionalized $SiO_2$ Nanoparticles incorporated Ultra-Thin Film Composite Mixed Matrix Membranes for Post-combustion Carbon Capture. Journal of Membrane Science. 515.
3. Lin K Y, Park A H. Effects of bonding types and functional groups on $CO_2$ capture using novel multiphase systems of liquid-like nanoparticle organic hybrid materials. Environ Sci Technol. 2011 Aug. 1; 45(15):6633-9.
4. Ota, M.; Hirota, Y.; Uchida, Y.; Nishiyama, N. $CO_2$ Adsorption Property of Amine-Modified Amorphous TiO2 Nanoparticles with a High Surface Area. Colloids Interfaces 2018, 2, 25.

5. Zhang, Huiying & Liu, Ruiqiang & Ning, Tangyuan & Lal, Rattan. (2018). Higher $CO_2$ absorption using a new class of calcium hydroxide (Ca(OH)2) nanoparticles. Environmental Chemistry Letters.
6. Isahak, Wan & Che Ramli, Zatil Amali & Lahuri, Azizul & Yusop, Rahimi & Wahab, Mohamed & Yarmo, Ambar. (2015). Enhancement of $CO_2$ Capture Using CuO Nanoparticles Supported on Green Activated Carbon. Advanced Materials Research. 1087. 111-115.
7. Mishra, Ashish & Sundara, Ramaprabhu. (2011). Nano magnetite decorated multiwalled carbon nanotubes: A robust nanomaterial for enhanced Carbon Dioxide adsorption. Energy Environ. Sci. 4. 889-895.
8. Planetary Hydrogen, "Technology", online: <https://www.planetaryhydrogen.com/technology/>, retrieved Jul. 3, 2021.
9. Awume, Bennet. Control of Hydrogen Sulphide Emissions Using Zinc Oxide Nanoparticles. University of Saskatchewan. July 2014.
10. Sekhavatjou, M., Moradi, R., Hosseini Alhashemi, A., & Taghinia Hejabi, A. A New Method For Sulphur Components Removal From Sour Gas Through Application of Zinc And Iron Oxides Nanoparticles. International Journal of Environmental Research (IJER) 8(2), 273-278. 2014.
11. Abdelrahman Ibrahim El-Diasty, SPE, The American University in Cairo (AUC) and Suez University, Egypt and Adel M. Salem Ragab. Applications of Nanotechnology in the Oil & Gas Industry: Latest Trends Worldwide & Future Challenges in Egypt. Society of Petroleum Engineers. 2013.
12. S. I. Martinez, PDVSA Intevep S. A.; C. Bastidas, Universidad Nacional Experimental Politècnica de la Fuerza Armada. Application of Transition Metal Nanoparticles in the Streams Production of Heavy Crude Oil Treatment: $H_2S$ Mitigation. Society of Petroleum Engineers. 2017
13. Christof Weinlaender, Raphael Neubauer, Christoph Hochenauer. Low-temperature $H_2S$ removal for solid oxide fuel cell application with metal oxide adsorbents. Oct. 7, 2016.
14. S. L. Whittaker, Clean Stream Technologies Middle East FZE. Use of NanoActive® Sulphur Scavenger NASS for $H_2S$ Removal in the Oil and Gas Industry. Society of Petroleum Engineers. 2018.
15. Amvrosios G. Georgiadis, Nikolaos D. Charisiou and Maria A. Goula. Removal of Hydrogen Sulfide From Various Industrial Gases: A Review of The Most Promising Adsorbing Materials. May 8, 2020.
16. Syed Mubeen, Ting Zhang, Nicha Chartuprayoon, Youngwoo Rheem, Ashok Mulchandani, Nosang V. Myung, and Marc A. Deshusses. Sensitive Detection of $H_2S$ Using Gold Nanoparticles Decorated SWNTs. Anal. Chem. 2010; 82(1); 250-257.
17. Izabela Konkol, Jan Cebula, Adam Cenian. Oxidization of hydrogen sulphide in biogas by manganese (IV) oxide particles. Aug. 14, 2019. Oxidization of hydrogen sulfide in biogas by manganese (IV) oxide particles (eeer.org).
18. Wang, De Ming. "Breakthrough behavior of $H_2S$ removal with an iron oxide based CG-4 adsorbent in a fixed-bed reactor." Thesis, University of Saskatchewan. September 2008.
19. Costa, C.; Cornacchia, M.; Pagliero, M.; Fabiano, B.; Vocciante, M.; Reverberi, A. P. Hydrogen Sulfide Adsorption by Iron Oxides and Their Polymer Composites: A Case-Study Application to Biogas Purification. Materials 2020, 13, 4725.
20. Blatt, O., Helmich, M., Steuten, B., Hardt, S., Bathen, D. and Wiggers, H. (2014), Iron Oxide/Polymer-Based Nanocomposite Material for Hydrogen Sulfide Adsorption Applications. Chem. Eng. Technol., 37: 1938-1944.
21. Nabipoor Hassankiadeh, Mojtaba & Hallajisani, Ahmad. (2020). Abstract of Application of Molybdenum oxide nanoparticles in $H_2S$ removal from natural gas under different operational and geometrical conditions. Journal of Petroleum Science and Engineering. 190.
22. Georgiadis, A. G.; Charisiou, N. D.; Yentekakis, I. V.; Goula, M. A. Removal of Hydrogen Sulfide ($H_2S$) Using MOFs: A Review of the Latest Developments. Chem. Proc. 2020, 2, 27.

PATENT DOCUMENTS

23. Canadian patent application publication no. 2,897,078 A1 (Sun et al.; Jan. 1, 2016), titled "Systems and Methods for Removal of Sulfur from Flue Gas".
24. Canadian patent application publication no. 2,915,623 A1 (Gupta et al; Dec. 18, 2015), titled "Separation of Carbon Dioxide from Flue Gases".
25. Canadian patent application publication no. 2,916,141 A1 (Chhina et al; Dec. 22, 2015), titled "Methods, Systems and Apparatuses for Capturing and Sequestering Carbon Dioxide Emitted from a Vehicle".

The claimed invention is:
1. A method for sequestering a pollutant gas comprising carbon dioxide ($CO_2$) or hydrogen sulfide ($H_2S$), or both carbon dioxide and hydrogen sulfide, in a subterranean reservoir, the method comprising:
   (a) pumping a carrier gas containing pollutant-sorbent particles into the subterranean reservoir;
   (b) allowing time for the pollutant-sorbent particles to attach to the subterranean reservoir;
   (c) pumping the pollutant gas into the subterranean reservoir, and allowing the pollutant-sorbent particles attached to the subterranean reservoir to adsorb the pollutant gas, thereby sequestering the pollutant gas in the subterranean reservoir;
   (d) injecting a modifier gas or a modifier liquid into the subterranean reservoir to vary one or more of a temperature in the subterranean reservoir, a pressure in the subterranean reservoir, or a pH of a liquid in the subterranean reservoir, and thereby cause the pollutant-sorbent particles to release the sequestered pollutant gas; and
   (e) producing the released pollutant gas from the subterranean reservoir to the surface.
2. The method of claim 1, wherein the pollutant gas comprises carbon dioxide, and the pollutant-sorbent particles comprise $CO_2$-sorbent particles.
3. The method of claim 2, wherein the $CO_2$-sorbent particles comprise a material selected from the group consisting of: a metal-organic framework (MOF); ethylenediamene; aluminum oxide ($Al_2O_3$); boron nitride (BN); calcium hydroxide ($Ca(OH)_2$); calcium oxide (CaO); calcium carbonate ($CaCO_3$); carbon including activated or porous carbon; copper oxide (CuO); gold (Au) graphene; graphene oxide; iron oxide ($Fe_2O_3$); lithium orthosilicate ($Li_4SiO_4$); magnesium oxide (MgO); magnetite ($Fe_3O_4$); nickel oxide (NiO); silicon/calcium (Si/Ca); silicon dioxide ($SiO_2$); titanium dioxide ($TiO_2$); a zeolite; and zirconium oxide ($ZrO_2$).
4. The method of claim 1, wherein the pollutant gas comprises hydrogen sulfide, and the pollutant-sorbent particles comprise $H_2S$-sorbent particles.

5. The method of claim 4, wherein the $H_2S$-sorbent particles comprise a material selected from the group consisting of: a metal-organic framework (MOF); zinc oxide (ZnO), iron oxide ($Fe_2O_3$), magnetite ($Fe_3O_4$), copper oxide (CuO), nickel oxide (NiO), calcium oxide (CaO), manganese oxide ($MnO_2$), and molybdenum oxide ($MoO_2$).

6. The method of claim 1, wherein the pollutant-sorbent particles comprise nanoparticles.

7. The method of claim 1, wherein the subterranean reservoir comprises a zone of a depleted steam chamber of a well that was used for a steam injection operation.

8. The method of claim 7, wherein pumping the carrier gas containing the pollutant-sorbent particles into the subterranean reservoir in step (a) is performed during or after a blowdown operation on the steam chamber.

9. The method of claim 1, wherein pumping the pollutant gas into the subterranean reservoir in step (c) is performed after pumping the carrier gas containing the pollutant-sorbent particles into the subterranean reservoir in step (a).

10. The method of claim 1, wherein pumping the pollutant gas into the subterranean reservoir in step (c) is performed at the same time as pumping the carrier gas containing the pollutant-sorbent particles into the subterranean reservoir in step (a).

11. The method of claim 1, wherein the carrier gas comprises air, methane, or steam.

12. The method of claim 1, where the modifier gas injected in step (d) comprises air, steam or methane.

13. The method of claim 1, wherein the modifier liquid injected in step (d) comprises a solution of an alkaline chemical selected from the group consisting of: sodium hydroxide (NaOH); sodium silicate ($Na_2SiO_3$); sodium carbonate ($Na_2CO_3$); and mixtures thereof.

14. The method of claim 1, wherein a first well is used for one or both of pumping the carrier gas containing the pollutant-sorbent particles into the subterranean reservoir or pumping the pollutant gas into the subterranean reservoir, and for producing the released pollutant gas from the subterranean reservoir to the surface.

15. The method of claim 1, wherein a first well is used for one or both of pumping the carrier gas containing the pollutant-sorbent particles into the subterranean reservoir or pumping the pollutant gas into the subterranean reservoir, and a second well is used for producing the released pollutant gas from the subterranean reservoir to the surface.

16. The method of claim 1, wherein (a) through (e) are repeatedly performed to cyclically sequester the pollutant gas in the subterranean reservoir, and produce the released pollutant gas from the subterranean reservoir to the surface.

17. The method of claim 1, wherein pumping the pollutant gas into the subterranean reservoir in step (c) comprises pumping a flue gas comprising the pollutant gas into the subterranean reservoir.

\* \* \* \* \*